March 18, 1947.  C. G. SEYFERTH  2,417,619
LANDING GEAR FOR TRAILERS
Filed Dec. 10, 1943  3 Sheets-Sheet 1

INVENTOR.
Carl G. Seyferth
BY
Barnes, Kisselle, Laughlin & Raisch
Attorneys

March 18, 1947.  C. G. SEYFERTH  2,417,619
LANDING GEAR FOR TRAILERS
Filed Dec. 10, 1943  3 Sheets-Sheet 2

INVENTOR.
Carl G. Seyferth
BY
Barnes, Kisselle, Laughlin & Raisch
Attorneys

March 18, 1947.  C. G. SEYFERTH  2,417,619
LANDING GEAR FOR TRAILERS
Filed Dec. 10, 1943  3 Sheets-Sheet 3

INVENTOR.
Carl G. Seyferth
BY
Barnes, Kisselle, Laughlin & Raisch
Attorneys

Patented Mar. 18, 1947

2,417,619

UNITED STATES PATENT OFFICE 2,417,619

LANDING GEAR FOR TRAILERS

Carl G. Seyferth, Muskegon, Mich., assignor to West Michigan Steel Foundry Company, Muskegon, Mich., a corporation of Michigan Application December 10, 1943, Serial No. 513,696

3 Claims. (Cl. 280—33.1)

1

This invention relates to landing gears or supports for the forward end of semi-trailers. The term semi-trailer is applied herein to those trailers of the type where the forward end rests upon a tractor or power unit through the means of a fifth wheel or the equivalent thereof and where the rear end is equipped with running gear. The landing gear is for the purpose of supporting the semi-trailer when it is detached from the tractor or power unit.

The general objects of the invention include the provision of a landing gear of strong, rugged construction having ground engaging elements which may be lowered to supporting position and elevated to vehicle operating position, and which embodies a structure which can be manufactured and supplied at a relatively low cost. The invention is directed particularly to the provision of a landing gear which embodies a straight reciprocating motion in the shift of the ground engaging elements to and from supporting position and vehicle operating position. The invention lends itself to the so called vertical lift landing gear, although the reciprocating movement may not be truly vertical, and the invention provides a mechanism for adjusting the landing gear which embodies a minimum of operating and machined parts, eliminating such items as gears, or screws, and minimizing the number of bearings.

In accordance with the invention, the ground engaging elements of the landing gear are mounted in association with other elements fixed to the body, for reciprocatory adjustable movement through the means of a form of link mechanism. The adjustments of the landing gear may be made by hand, as disclosed herein, although the landing gear may be used with power means for elevating and lowering the ground engaging elements. The link structure is not called upon to support the load of the vehicle, as other means are provided for locking or latching the ground engaging elements in both lowered and raised positions. The link structure includes a few articulated joints and these are housed and kept free from dirt or other extraneous matter, and exposure to the elements and the like. Other objects of the invention will be more fully appreciated as the detailed description is considered with the accompanying drawings. The drawings show one form of apparatus for carrying out the invention.

Figure 1:
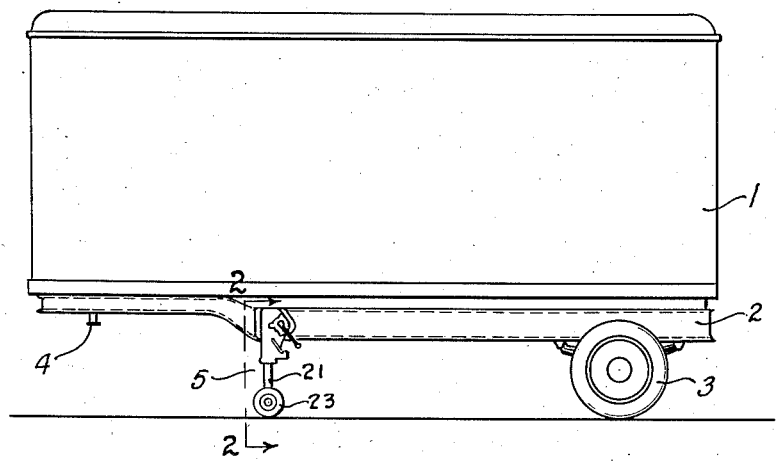
Fig. 1 is a side elevational view of a diagrammatic nature illustrating a semi-trailer detached from a tractor, and showing it supported by landing gear.

A rather conventional form of semi-trailer is shown in Fig. 1, having a body 1 positioned on a frame 2 which is provided at its rear end with running gear including wheels 3. The forward end of the frame is to rest upon a tractor and the frame is shown as having a depending king pin 4 designed to co-operate with a socket of a lower fifth wheel member located on the tractor. This tractor arrangement together with the lower fifth wheel is well known to those versed in the art, and needs no disclosure or description herein. The landing gear which supports the forward end of the semi-trailer is shown in supporting position in Fig. 1, and is generally illustrated at 5.

Figure 2:
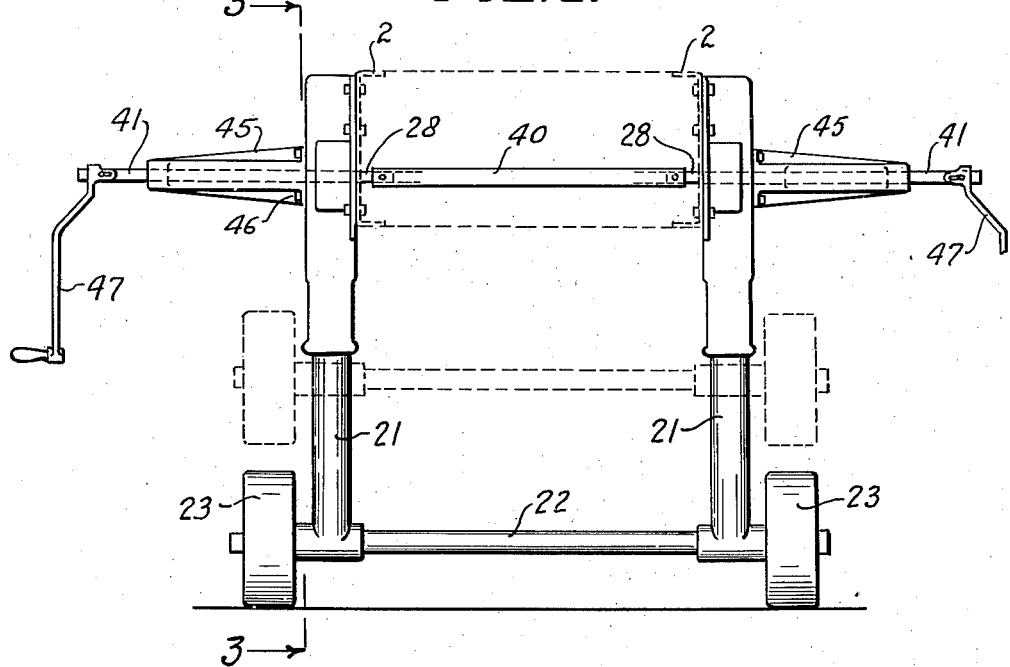
Fig. 2 is an enlarged sectional view taken substantially on 2—2 of Fig. 1.

As illustrated in Fig. 2 there are two struts or legs of the landing gear, one attached to each side of the trailer frame. Some vehicles are constructed without a frame per se and the body itself constitutes its own frame, and obviously in such a case, the landing gear may be attached directly to the body.

Figure 3:
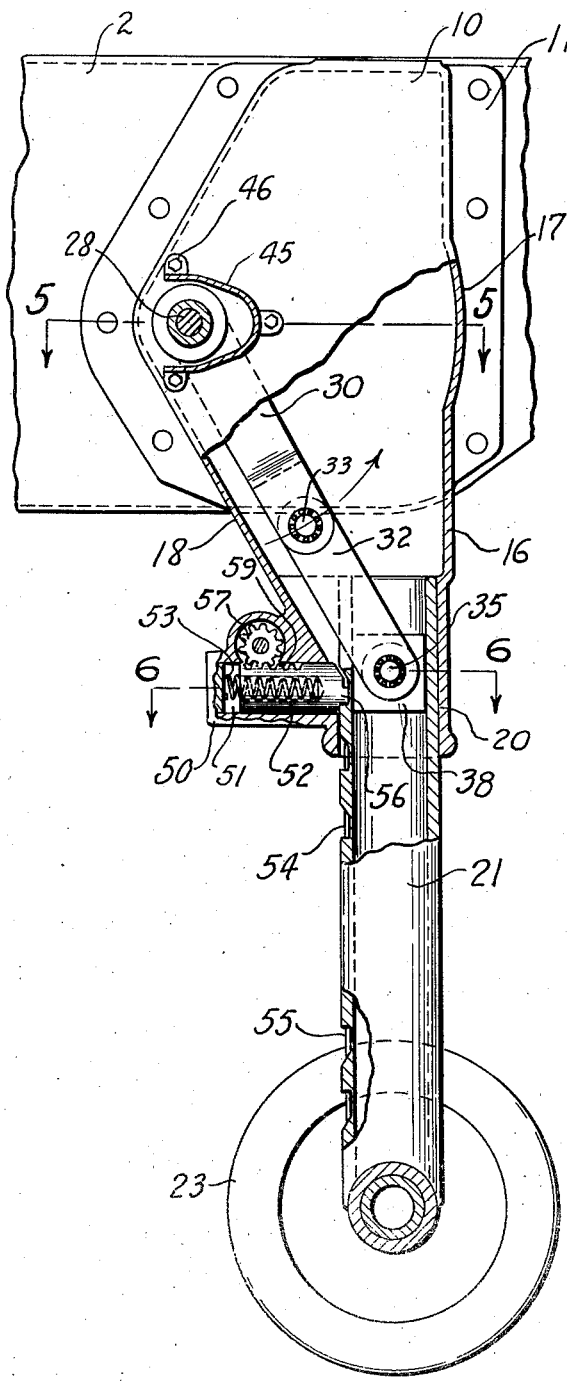
Fig. 3 is a further enlarged view looking at one leg of the landing gear, in the direction of the arrows 3—3 of Fig. 2, showing some of the parts in section, and illustrating the ground engaging elements lowered to supporting position.
Figure 5:
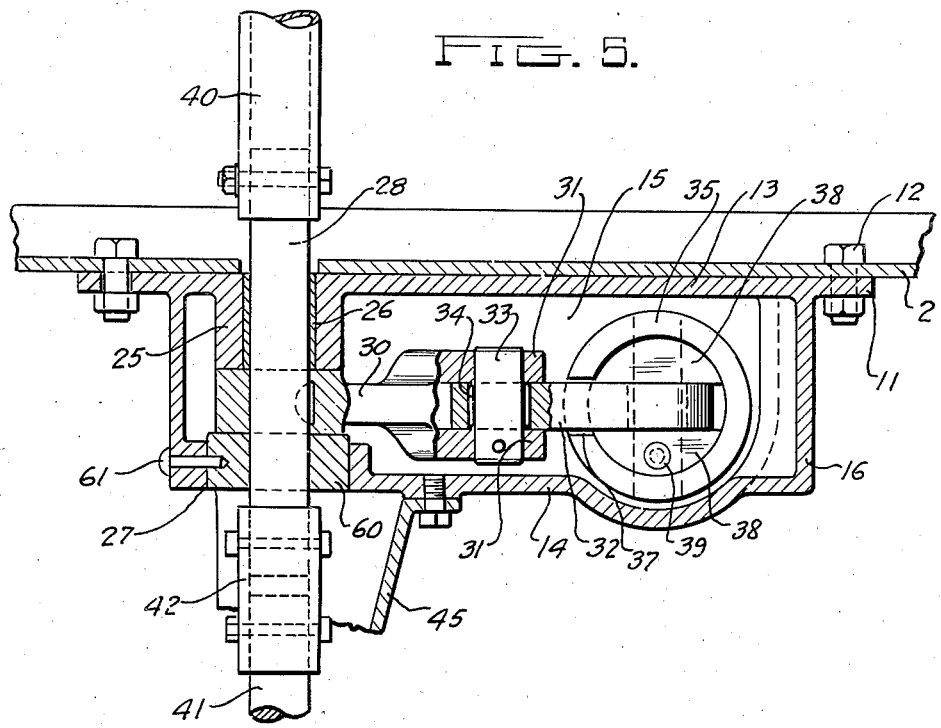
Fig. 5 is a further enlarged view taken substantially on line 5—5 of Fig. 3, illustrating the link structure and the housing therefor.
Figure 6:
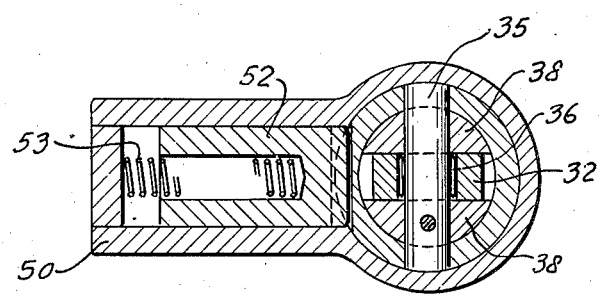
Fig. 6 is a somewhat enlarged sectional view taken on line 6—6 of Fig. 3.

The features of the leg or strut construction is illustrated in Figs. 3 and 5. The fixed portion of the landing gear includes a member attached to the vehicle frame and this member may be a steel casting. The member is provided with a hollow body portion 10, provided with a flange 11 for attachment to the frame by bolts or rivets or the like as shown at 12. One wall and the body portion as at 13 may lie flush against the frame while the other or outer wall 14 is spaced therefrom to provide a hollow interior as at 15. One end wall 16 may be substantially vertical except where it is formed outwardly as at 17 for clearance as presently will appear. The opposite wall 18 is of angular construction to provide an adequate dimension across the housing at its center portion.

The lower end of the housing is provided with a hollow guide 20 which may be tubular in form for slidably receiving a leg or post 21 which may be tubular. As shown in Fig. 2 an axle structure 22 is joined to the lower ends of the supports 21 which ties the two supports together and the same axle structure may also carry suitable ground engaging elements, here shown as wheels 23.

The mechanism for shifting the supporting legs in their guides is disposed within the housing 15, it being understood that there is such a mechanism in each housing. As illustrated in Fig. 5, the housing is formed with a support 25 for receiving a bearing 26, the support being in alignment with an opening 27, and a shaft 28 is journaled in the bearing. Keyed or otherwise non-rotatably connected to the shaft 28 is a link 30 having a forked end 31 for receiving the end of another or lower link 32. The two links are pivotally connected by a pin 33 preferably through the means of needle roller bearings 34, the pin 33 being held positioned to the link 30 by a drive pin 35.

The lower link 32 is coupled to the support 21 by a wrist pin 35 preferably through the means of needle roller bearings 36. The wrist pin 35 is preferably disposed a distance below the upper end support 21 and to accommodate the link 32, the upper end of the support 21 is slotted as of 37. In order to hold the wrist pin 35 in position, and to locate the end of the link 32, spacers or blocks 38 are employed. Each spacer has a flat inner surface facing the link and a rounded outer surface lying against the inner wall of the support 21. One spacer is secured to the wrist pin 35 by a drive stud 39.

The shaft 28 may be only a stub shaft and connected to one end may be a hollow shaft or tube 40 which extends across the frame and connects to the opposite stub shaft. A drive shaft 41 may be connected to the stub shaft 28 by a suitable coupling 42. In order to latterly extend the drive shaft 41 so that it may be accessible for operation, a support or bracket 45 may be attached to the housing as at three points as indicated at 46, the outer end of which forms a journal for the drive shaft 41. A crank 47 may be attached to the outer end of the drive shaft 41 so that the crank may be folded into non-operating position. As will be seen by reference to Fig. 2, the structure is duplicated on opposite sides of the frame and like reference characters are applied to like parts.

The housing or casting 10 is formed with an enlargement 50, provided with a chamber 51 for slidably receiving a bolt 52 backed up by a spring 53. This bolt is for cooperation with one or more notches 54 in the leg 21 for supporting the load of the trailer when the support is in ground engaging position. As shown in Fig. 3, there are three of such notches. The bolt is also formed to cooperate with one or more notches or keepers 55 in the lower end of the leg for holding the leg elevated in vehicle operating position. As will be seen by reference to Fig. 3, the lower edges of keeper notches 54 are abrupt and the upper edges are inclined whereas, this arrangement is reversed in the keeper notches 55. The bolt has a nose 56 for cooperation with both sets of keeper notches. The spring 53 normally keeps the bolt projected and means are provided for retracting the bolt. This means may take the form of a pinion 57 keyed to a stub shaft provided with a handle 58, and the teeth of the pinion mesh with teeth 59 formed on the bolt.

Figure 4:
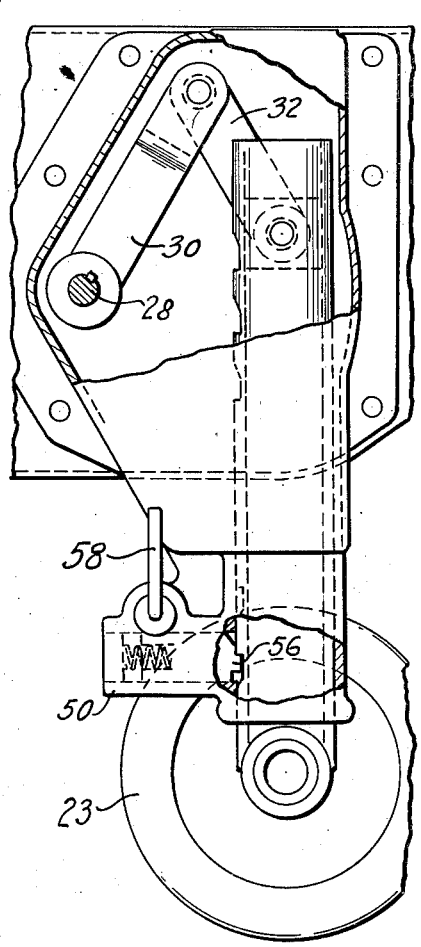
Fig. 4 is a view similar to Fig. 3 showing the ground engaging elements elevated to vehicle operating position.

As mentioned above the landing gear is shown in trailer supporting position in Fig. 1 and in Fig. 3. In this position the support 21 is lowered and the bolt is projected into one of the keeper notches 54. At this time, as shown in Fig. 3, the operating link structure is preferably in a position so that the two links are substantially in line with each other and thus, providing the greatest lineal distance between the shaft 28 and the wrist pin 35. In some instances, depending upon ground conditions, the bolt may engage one of the lower keeper notches, in which event the support is not extended as much as is shown in Fig. 3. To elevate the supporting legs the bolts 52 are retracted and an operator, having shifted one of the cranks 47 into operating position, turns the drive shaft 41. This rocks the shaft 28 counter-clockwise as Figs. 3 and 4 are viewed. This swings the link 30 upwardly, the extreme lower and upper positions being shown in Figs. 3 and 4. The link 32 depends from the link 30 and pulls the supporting leg upwardly in this operation. When the link 30 is substantially in a horizontal position the link 32 hangs substantially vertically, and at this time the formation 17 in the housing provides the necessary clearance. When the leg reaches its uppermost position the bolt is projected into upper notch 55. If further upper movement of the support is permissible the bolt rides over the inclined surface and then may drop into the lower notch 55. To lower the legs the operation is reversed in that the bolts 52 are retracted and the legs allowed to lower as the operator preferably controls the action through the means of the crank. As the legs reach their lower limit, the bolt may come to rest in the first, second, or third notch 54, depending upon ground conditions. It will be understood that when the landing gear legs are thus adjusted that they both move in unison since the link systems are inter-connected by the shaft 40.

In making the assembly, the links may be assembled with each other and with the leg 21, and then passed through the sleeve portion 20. Then the shaft 28 may be passed through the housing and through the end of the link 30. The opening 27 facilitates the assembly of the shaft 28, and after the shaft is in place the opening is closed by a collar 60 which is held assembled by a drive pin 61.

I claim:

1. A landing gear for a trailer comprising, a body member for attachment to the trailer, a guide on the body member, a supporting leg slidably positioned in the guide, the guide and leg being arranged for substantially vertical reciprocatory movement of the leg, an operating shaft journaled in the body member, a link, means non-rotatably connecting one end of the link to the operating shaft, the operating shaft being positioned on a substantially horizontal axis located above the guide and latterly removed from the guide a distance substantially equal to the length of the link, a second link, means pivotally connecting one end of the second link to the supporting leg, means pivotally connecting together the other ends of the links, means for rocking the shaft, said shaft being rockable within limits for positioning the first named link in a downwardly inclined position toward the line of reciprocation of the leg and in an upwardly inclined position toward the line of reciprocation of the leg, and means for latching the supporting leg in projected load supporting position and in retracted vehicle operating position.

2. A landing gear for a trailer comprising a casting for attachment to the trailer, said casting including a housing, a sleeve like guide on a substantially vertical axis extending downwardly from the housing and opening into the housing, a supporting leg slidably positioned in the guide, an operating shaft journaled in the body member, a pair of pivotally connected links positioned in the housing, one end of one link being keyed to the shaft, one end of the other link being pivotally connected to the supporting leg, means for rocking the shaft for effecting reciprocatory movement of the supporting leg in the guide and housing, a spring pressed bolt projectable into the guide and notches in the supporting leg for receiving the bolt to hold the leg in lowered load supporting position and in elevated vehicle operating position.

3. In a landing gear for a trailer comprising, a body casting for attachment to the trailer, said casting including a hollow formation constituting a housing and having a sleeve-like guide opening downwardly from the housing and substantially on a vertical axis, a supporting leg slidably positioned in the guide, an operating shaft journalled in the housing and extending therethrough, a pair of pivotally connected links positioned in the housing, one end of one link being non-rotatably connected to the operating shaft, one end of the other link being pivotally connected to the supporting leg, the said one link being operable by the rocking of the shaft to and from downwardly inclined and upwardly inclined extreme positions for shift of the supporting leg and cooperating means on the guide and leg for locking the leg in lowered load supporting position and in elevated vehicle operating position.

C. G. SEYFERTH.

REFERENCES CITED

The following references are of record in the file of this patent:

UNITED STATES PATENTS

| Number | Name | Date |
| --- | --- | --- |
| 1,082,160 | Kurowski | Dec. 23, 1913 |
| 1,727,430 | Gilkison | Sept. 10, 1929 |